Figure 1:
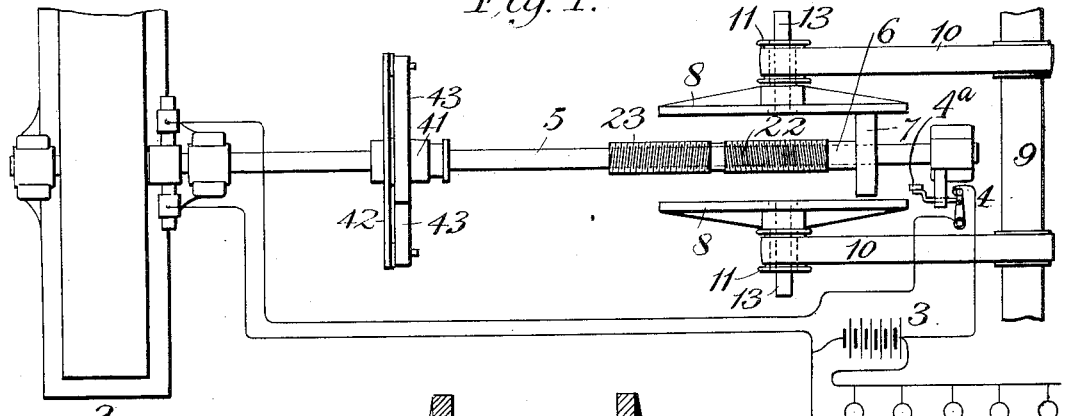

No. 810,176. PATENTED JAN. 16, 1906.
J. H. THOMPSON.
POWER TRANSMISSION MECHANISM.
APPLICATION FILED FEB. 18, 1905.

2 SHEETS—SHEET 1.

Witnesses

Inventor
John H. Thompson
By
His Attorneys

No. 810,176.　　　　　　　　　　　　　　　PATENTED JAN. 16, 1906.
J. H. THOMPSON.
POWER TRANSMISSION MECHANISM.
APPLICATION FILED FEB. 18, 1905.

2 SHEETS—SHEET 2.

Witnesses　　　　　　　　　　　　　　　Inventor
　　　　　　　　　　　　　　　　　　　　John H. Thompson

UNITED STATES PATENT OFFICE.

JOHN H. THOMPSON, OF CHARLESTON, WEST VIRGINIA, ASSIGNOR TO UNIVERSAL ELECTRIC EQUIPMENT COMPANY, OF BIRMINGHAM, ALABAMA, A CORPORATION OF ALABAMA.

POWER-TRANSMISSION MECHANISM.

No. 810,176.  Specification of Letters Patent.  Patented Jan. 16, 1906.

Application filed February 18, 1905. Serial No. 246,297.

*To all whom it may concern:*

Be it known that I, JOHN H. THOMPSON, a citizen of the United States, residing at Charleston, in the county of Kanawha and State of West Virginia, have invented certain new and useful Improvements in Power-Transmission Mechanism; and I do hereby declare the following to be a full, clear, and exact description of the invention, such as will enable others skilled in the art to which it appertains to make and use the same.

This invention relates to power-transmission or driving mechanism designed particularly for use in electric train lighting, heating, or other systems for running a dynamo-electric generator from one of the car-axles and maintaining a uniform generation of electricity by driving the armature-shaft at a substantially uniform speed and always in one direction notwithstanding the variable rotations of the car-axle due to differences in the speed and direction of travel of the train. Such an application of the invention is illustrated and described in the present instance, though without limitation to this specific use, since the invention is capable of general utility and adapted for running or driving any machine or driven shaft from a driving shaft or axle rotating intermittently or at a variable speed.

The invention provides improved mechanism of practicable and efficient construction and reliable operation, effectively performing the following functions: first, running the driven machine or shaft, such as the armature-shaft of a dynamo-electric generator, at a substantially uniform speed from the driving shaft or axle running at a variable speed; second, rotating the driven shaft always in the same direction whether the driving-shaft rotates in one or the other direction, and, third, automatically controlling an auxiliary instrumentality, such as an independent battery for supplying electrical energy when the generator is not in operation or an auxiliary motor for operating the generator when not driven from the driving-shaft.

Without restricting myself to the specific illustrated construction and embodiment of the invention, since obviously the same is susceptible of modifications in details of construction and arrangement and in respect to the particular mechanisms or devices involved the invention will be fully described with reference to the accompanying drawings, which form a part of this specification, and will then be particularly pointed out, and defined in the appended claims.

Figure 2:
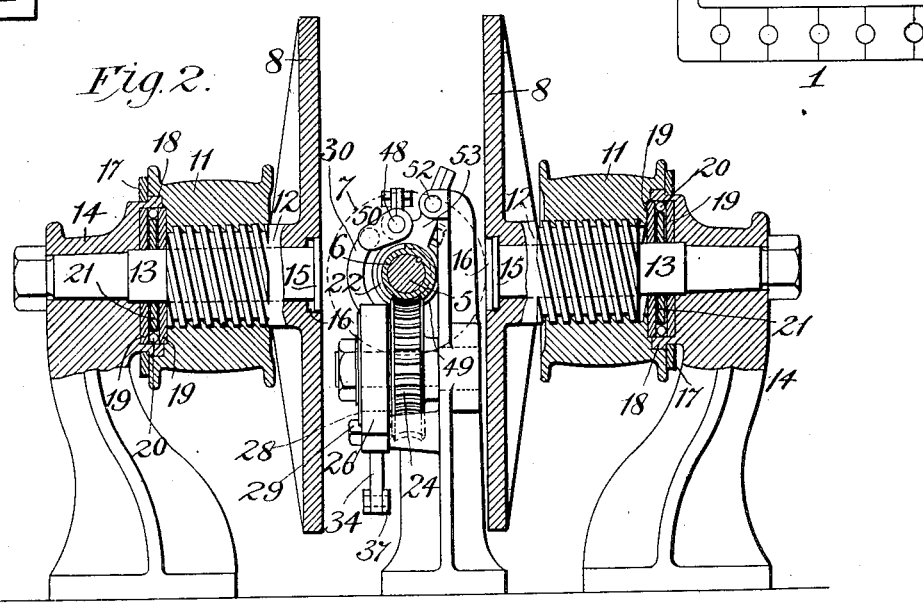
Figure 5:
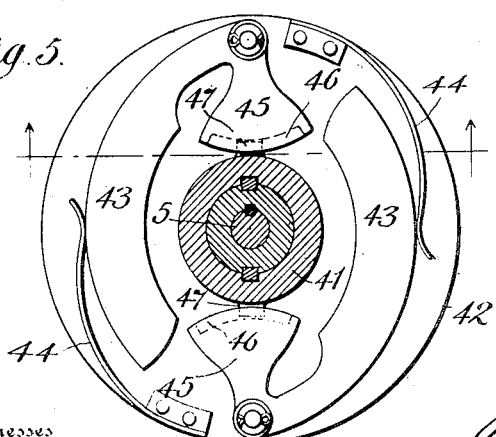
Figure 6:
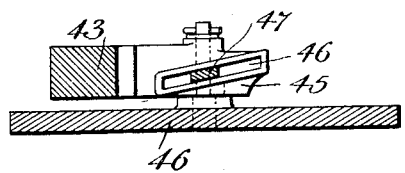
Figure 3:
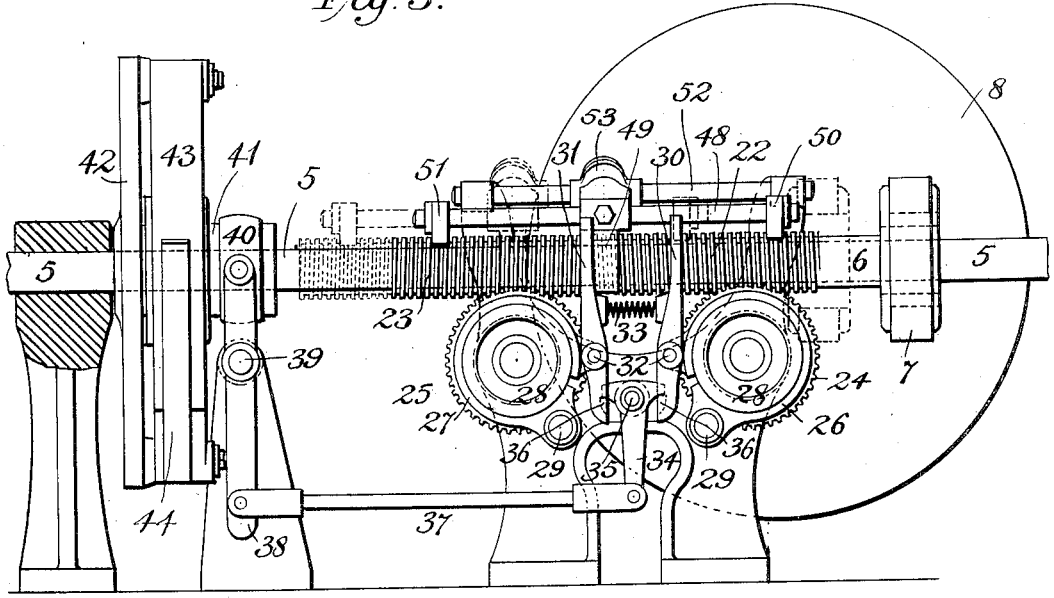
Figure 4:
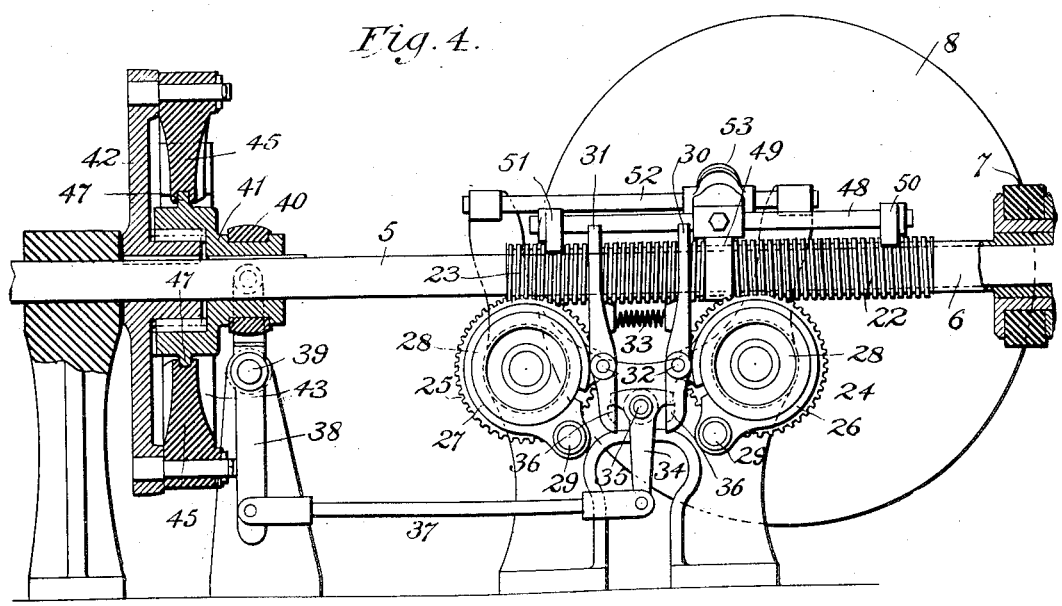

In said drawings, Figure 1 is a top plan view of mechanism embodying my invention, shown applied to running a dynamo-electric generator, the armature-shaft of which is driven from the car-axle. An electric-lamp circuit connected with the generator or dynamo is represented diagrammatically, together with a battery and an automatically-controlled switch for connecting and disconnecting the battery with the lamp-circuit. Fig. 2 is a vertical cross-section through the driving friction-disks or face-wheels, showing the interposed driven friction-wheel on the armature-shaft in elevation. Fig. 3 is a side elevation of the driving mechanism with parts in longitudinal vertical section, showing the driven shaft or armature-shaft operated from the driving-shaft or car-axle when running at moderate speed, with dotted lines indicating the changed positions of the mechanism when the armature-shaft is driven from the car-axle rotating at high speed. In this view the friction-disk nearest the observer is not shown, being removed for better disclosure of the transmisson mechanism. Fig. 4 is a view similar to Fig. 3, showing the mechanism when the armature-shaft is driven from the car-axle rotating at low speed. Fig. 5 is a face view of a governor on the armature-shaft for controlling the speed by shifting the driven friction-wheel to different positions with respect to the center of the driving friction-disk or face-wheel. Fig. 6 is a detail view of a fragment of the actuating-governor.

A particular explanation of the illustrated mechanism is as follows:

1 denotes an electric-lamp circuit connected with a dynamo-electric generator 2, which generates the electricity for operating the train-lights when the train is running.

3 indicates an auxiliary battery for furnishing the electricity when the train is at rest or moving too slowly to effectively operate the dynamo, and 4 is a switch for connecting and disconnecting the battery.

5 denotes a driven shaft, here the armature-shaft of the dynamo or generator.

6 is a slidable hollow shaft splined on shaft 5 and having fast thereon a friction-wheel or pulley 7. This friction-wheel 7 is shown located between two confronting friction-disks or larger drive-wheels 8, which are driven from the driving-shaft—in this case from the car-axle 9—as by belts 10, passing around pulleys 11 on the hubs 12 of said friction-disks. According to the direction of travel of the train one or the other of these friction-disks 8 contacts with and imparts rotation to the friction-wheel 7, thus running the dynamo. As the speed of the train varies the friction-wheel 7 is automatically shifted to different positions with respect to the center of its driving friction-disk 8, as hereinafter explained, to maintain a substantially uniform speed of the armature-shaft.

Referring to Fig. 2, the friction-disks 8 are shown journaled on axles 13, projecting inward from the brackets or standards 14. Each friction-disk is allowed a certain movement longitudinally of its axle in order to move to and from contact with the friction-wheel 7. This movement is limited in one direction by abutment of the hub 12 against its thrust-bearing and in the opposite direction by a collar 15 on the axle 13. Said collar 15 is preferably contained in a socket 16 in the center of the friction-disk, and the depth of the socket between the collar and body of the disk is the extent of movement of the disk lengthwise on its axle. The hub 12 of each disk is screw-threaded and engaged by a female screw or thread in its pulley 11, so that rotation of the pulley in one direction will screw out the hub, and thus move the disk into contact with the friction-wheel 7, while rotation of said pulley in the opposite direction will screw in the hub, and thus move the friction-disk away from said friction-wheel. The pulley is prevented from following its friction-disk or held from lengthwise movement, for which purpose is shown a ring or collar 17, screwed or fastened to the outer side of said pulley and bearing against a shoulder or annular surface, as at 18, on the bracket or standard 14. An appropriate antifriction thrust-bearing is also shown, comprising wearing-plates 19 and an interposed series of balls 20 with a suitable separating-ring 21. The mechanism is the same for both friction-disks, except that the screws or threads of the two hubs are parallel or in the same direction, being reversed or opposed when the disks are considered otherwise than in their confronting relation, so that when one friction-disk is forced into driving contact with the friction-wheel 7 the other is kept out of contact, the hub of the latter being screwed in its pulley. Hence inasmuch as both friction-disks are driven from the car-axle it is immaterial which way the train travels, for when going in one direction one friction-disk will engage at one side of the friction-wheel 7, while on going in the opposite direction the other friction-disk will engage on the opposite side of said friction-wheel, and hence in either case the armature-shaft will be rotated in one and the same direction.

It is obvious that the armature-shaft 5 will rotate faster when the friction-wheel 7 is driven from the peripheral portion of one of the driving friction-disks 8 than when it is driven from a more central portion of said disk. This principle is utilized for maintaining a substantially uniform speed of said shaft 5, as before mentioned, by sliding the hollow shaft 6 back and forth to move the friction-wheel 7 to and from the center of the friction-disk in accordance with variations in the speed of rotation of the driving-shaft, which, in the present illustration being the car-axle, varies, of course, with the speed of the train. The illustrated mechanism for performing this function is as follows: The slidable shaft 6 has oppositely threaded screws, or a right-hand screw 22 and a left-hand screw 23. The former is in engagement with an idle worm-wheel 24. The latter is in engagement with an idle worm-wheel 25. As the shaft 6 revolves the two worm-wheels turn freely, unless one or the other is checked; but on stopping rotation of either worm-wheel its teeth, in mesh with one of the screws, causes the shaft to slide backward or forward, according to which worm-wheel is checked or held stationary. In the illustrated mechanism the friction-wheel 7 is moved toward the center of its friction-disk by checking the worm-wheel 24 and away from the center or toward the periphery by checking the worm-wheel 25. For checking the worm-wheels suitable brake mechanism may be employed, and in this connection 26 and 27 denote divided brake-bands, friction-rings, or straps surrounding the hubs of the worm-wheels 24 and 25, respectively, or surrounding annular flanges 28 on said wheels. Said brake-bands are preferably of spring-steel, each having one end fixed at 29 and the other end free. They surround the said hubs or flanges 28 of the worm-wheels loosely or without frictional contact therewith, but are adapted to be tightened around the same to brake and check or stop rotation of the said worm-wheels.

30 and 31 are brake trips or levers pivotally attached at 32 to the free ends of the brake-bands 26 and 27, respectively.

33 is a spring interposed between the upper arms of the trips or levers 30 and 31, and yieldingly forcing them apart.

34 is a tri-armed or T-shaped brake-actuating lever, pivoted at 35 between the trips or levers 30 and 31 and having its opposite arms engaging lugs or sockets in said levers at 36. The medial arm of said T-shaped lever is pivotally connected by a link 37 with a lever 38, which is actuated by a governor for operating or applying and releasing the brakes.

Any suitable centrifugal governor may be employed for controlling the brakes. The illustrated construction is simple, effective, and particularly appropriate for the present mechanism and is as follows: The lever 38, to one arm of which the link 37 is connected, has an intermediate fulcrum 39 and has its other arm connected to a ring or collar 40, mounted loose in a groove on a sleeve 41, which is slidable on but rotatable with the armature-shaft, being suitably feathered thereon. Fast on the armature-shaft is a disk or other element 42, having a governor-weight, or preferably two oppositely-disposed governor-weights 43, pivoted to the disk and drawn inward or toward the center thereof by a spring or springs 44. These governor-weights control oscillatory segments 45 co-pivotal therewith, and said segments have their inner ends provided with cam-grooves 46, which engage lugs 47 on the sleeve 41. Hence it is obvious that as the weights move in and out, due to variations in the speed of revolution, the sleeve 41 is slid back and forth, thus imparting motion to the brake-actuating mechanism. Thus as the speed of the train varies the friction-wheel 7 is automatically shifted to different positions with respect to the center of its driving friction-disk 8. At a certain moderate or normal speed the brake-actuating governor will maintain the brakes released from both worm-wheels 24 and 25, and the wheel or pulley 7 will be driven from the friction-disk 8 at a point intermediate the periphery and center of the latter, as shown in full lines in Fig. 3. Should the speed increase, the governor will apply the brake 26 of worm-wheel 24, thus causing the shaft 6 to move the friction-wheel 7 toward the center of the driving friction-disk 8. Should the speed decrease below the aforesaid moderate rate, the governor will apply the other brake 27 of the worm-wheel 25, thus causing the shaft 6 to carry the friction-wheel 7 out toward the periphery of said friction-disk 8. Hence while the train is running a practically uniform rate of speed of the armature-shaft is maintained, notwithstanding variations in the motion of the train.

The brakes 26 and 27 may of course be operated automatically by other suitable mechanism controlled by the speed of rotation of one of the shafts, and also in place of the worm-wheels 24 and 25 other devices may be employed for engaging the right and left screws of the shaft 6 for reciprocating the friction-wheel 7.

The mechanism is preferably so arranged or adjusted that the friction-pulley 7 will be driven from the peripheral and central portions of the driving friction-disk at certain predetermined speeds of rotation of the driving-shaft—say at the train-speeds of six and sixty miles per hour, respectively—that is, while the train is moving at or below a speed of six miles per hour—the wheel or pulley 7 is driven from the peripheral portion of said disk 8. As the speed gradually increases the wheel 7 is moved nearer the center of the driving-disk, and during the regular run of the train at moderate or normal speed said wheel 7 is driven from an intermediate position between the center and periphery of the disk and is shifted back and forth to compensate for the variations in the velocity of the train and maintain a uniform rotation of the armature-shaft, as before explained. When the train attains a velocity of sixty miles per hour, the wheel 7 is driven from the central portion of the disk or at its extreme inner position.

It is obvious that the continued application of either of the brakes 26 or 27 at increasing or accelerating high or low speeds would cause the shaft 6 to carry the wheel or pulley 7 beyond the center or periphery of its driving-disk 8 unless means were provided to positively release the brakes independently of the actuating-governor. I provide for such positive release of the brakes as follows: The hollow shaft 6 carries a longitudinally-disposed rod 48, shown attached to said shaft at 49. Said rod carries at its opposite ends trippets or lugs 50 and 51, adapted to engage the upper projecting ends of the brake trips or levers 30 and 31, respectively, to positively and quickly release the brakes when the shaft 6, carrying the friction wheel or pulley 7, is moved to one or the other of its extreme positions. 52 denotes a guide-rod for a guide or sleeve 53, attached to said rod 48. When one of the trippets or lugs 50 or 51 comes into contact with one of the brake trips or levers 30 or 31, the corresponding brake 26 or 27 being applied, it rocks or forces the brake-trip against the tension of the spring 33 and unhooks or disengages said trip from the brake-actuating lever 34 at 36, thus positively and quickly releasing the brake.

The mechanism constructed and operating on the principles set forth is well adapted to control an auxiliary instrumentality—such, for example, as a supplemental device or apparatus for operating the train-lights or for running the dynamo when the speed of the driving-shaft or car-axle is too low to effectively run the dynamo. As illustrated, the auxiliary battery 3 is connected and disconnected from the circuit by the switch 4, which is actuated for opening by the travel of the shaft 6 and may be self-closing. When the train slows down—say below six miles per hour—and the friction-wheel 7 is consequently moved out to the periphery of its driving friction-disk, the switch 4 is opened by abutment of the wheel 7 against the arms 4ª. When the speed of the train increases above this point, the wheel 7 is moved in toward the center of the driving-disk and the switch closes.

The operation of the mechanism will be fully understood from the foregoing description, taken in connection with the accompanying drawings, and hence may be summarized as follows, considering the mechanism for convenience of explanation as incorporated in an axle-driven electric train-lighting system, for which it is especially designed and adapted: When the train is at a standstill, as when waiting or stopping at a railway-station, or when it is running at a low speed—say below six miles per hour—the electricity for operating the train-lights is supplied by the battery, the switch 4 having been opened by the friction wheel or pulley 7 when carried outward or to the periphery of its driving friction-disk 8 when the train last slowed down. When the train starts, one or the other of the friction-disks 8 is moved into driving contact with the friction-wheel 7, as previously explained. One disk drives the wheel at one side when the train travels in one direction. The other disk drives it at the other side when the train travels in the opposite direction, either disk driving the wheel in the same direction, so as to maintain a constant direction of rotation of the armature-shaft. As the speed of the train increases the speed of the armature-shaft also tends to increase, and hence the brake-actuating governor applies the brake 26 to the worm-wheel 24, causing the shaft 6 to move the friction-wheel 7 inward or toward the center of its driving friction-disk to compensate for the increase in speed of the train and maintain a uniform rate of rotation of the armature-shaft. After the velocity of the train reaches, say, six miles per hour, the switch 4 closes, the wheel 7 having moved away from the arm 4ª. During the running of the train a practically uniform rotation of the armature-shaft is attained by the brake-actuating governor, which applies and releases the brakes 26 and 27 to cause the shifting of the shaft 6 and its wheel or pulley 7 to compensate for increase or reduction of speed, as now well understood. At a high speed of the train—say about sixty miles per hour—the wheel 7 is driven by its friction-disk at a point near the center thereof. When a continued or accelerating high speed causes a marked or extended application of the brake 26 and a consequent inward shifting of the wheel 7 to the center of the disk, the lug or trippet 50 comes in contact with the brake-trip 30 and disengages it from the brake-lever 34, thus releasing the brake 26. Likewise, when a decreasing or continued low speed of the train causes a marked or prolonged application of the brake 27 and a consequent outward shifting of the wheel 7 to the periphery of the disk 8 the trippet 51 comes in contact with the brake-trip 31 and in the same manner disengages it from the brake-lever 34 and releases said brake 27.

Instead of the mechanism shown for operating the drive wheels or disks 8 for moving them into and out of contact with the friction-wheel 7 on the armature-shaft it may be desirable to actuate said wheels or disks by a centrifugal governor similar to that employed for actuating the brake mechanism or some other similar suitable mechanism, thereby running its armature-shaft from the driving-shaft only at a certain predetermined speed.

I claim as my invention and desire to secure by Letters Patent of the United States—

1. Power-transmission or driving mechanism comprising, in combination, driving and driven shafts, a slidable sleeve or hollow shaft splined on the driven shaft having a friction-wheel and having right-hand and left-hand screws, a friction-disk or face-wheel driven by the driving-shaft and coactive with said friction-wheel, means for engaging one screw or the other to shift the friction-wheel toward and from the center of the friction-disk, and actuating mechanism governed by the speed of one shaft for automatically operating said means to compensate for variations in rate of speed of the driving-shaft.

2. Power-transmission or driving mechanism comprising, in combination, driving and driven shafts, a slidable sleeve or hollow shaft splined on the driven shaft, a friction-wheel carried thereby right-hand and left-hand screws on the driven shaft, a friction-disk or face-wheel driven by the driving-shaft and coactive with said friction-wheel, idle worm-wheels engaging said screws, and means automatically controlled by the speed of the driven shaft for checking rotation of either worm-wheel to shift said sleeve and thereby adjust the position of said friction-wheel with relation to said friction-disk to compensate for variations in the rate of rotation of the driving-shaft.

3. Power-transmission or driving mechanism comprising, in combination, a driven shaft, a slidable sleeve or hollow shaft splined thereon having oppositely-threaded screws and a friction-gear also carried thereby, a coactive driving friction-disk or face-wheel, idle worm-wheels in mesh with said screws, brake-bands or friction-rings associated with the hubs or flanges of said worm-wheels, an interposed brake-actuating lever connected with said brake-bands for applying or tightening one or the other, and actuating mechanism therefor automatically governed by the speed of rotation of the shaft.

4. Power-transmission or driving mechanism comprising, in combination, a driven shaft, a slidable sleeve or hollow shaft splined thereon having oppositely-threaded screws and a friction-gear also carried thereby, a coactive driving friction-disk or face-wheel, idle worm-wheels in mesh with said screws, brake-bands or friction-rings associated with the hubs or flanges of said worm-wheels, brake-trips pivoted to the free ends of said bands and spring-forced apart, an interposed brake-actuating lever having opposite arms engaging said trips and adapted to apply one brake or the other when said lever is rocked, automatic actuating mechanism for said lever, and trippets carried by said sleeve adapted to engage said brake-trips and disengage them from the brake-actuating lever to release the brakes.

5. Power-transmission or driving mechanism comprising, in combination, driving and driven shafts, a slidable sleeve or hollow shaft splined on the driven shaft having a friction-wheel and having right-hand and left-hand screws, a friction-disk or face-wheel driven by the driving-shaft and coactive with said friction-wheel, means for engaging one screw or the other to shift the friction-wheel toward and from the center of the friction-disk, and actuating mechanism governed by the speed of one shaft for automatically operating said means to compensate for variations in rate of speed of the driving-shaft, said actuating mechanism comprising a centrifugal governor on the driven shaft and operative connections between the same and said screw-engaging devices.

6. Power-transmission or driving mechanism comprising, in combination, driving and driven shafts, a slidable sleeve or hollow shaft splined on the driven shaft having a friction-wheel and having a right-hand and left-hand screws, a friction-disk or face-wheel driven by the driving-shaft and coactive with said friction-wheel, idle worm-wheels engaging said screws, and means automatically controlled by the speed of the driven shaft for checking rotation of either worm-wheel to shift said sleeve and thereby adjust the position of said friction-wheel with relation to said friction-disk to compensate for variations in the rate of rotation of the driving-shaft, and means carried by said slidable sleeve for positively releasing the braking of the worm-wheels as the friction-wheel is moved to one or the other of its extreme positions.

7. Power-transmission or driving mechanism comprising, in combination, driving and driven shafts, a friction-wheel on said driven shaft, coactive friction-disks or face-wheels driven by said driving-shaft and arranged at opposite sides of said friction-wheel, and means for moving one of said disks or face-wheels into driving contact with said friction-wheel when the driving-shaft rotates in one direction and the other when said driving-shaft rotates in the opposite direction.

8. Power-transmission or driving mechanism comprising, in combination, a driven shaft, a friction-wheel carried thereby, and driving friction-disks or face-wheels at opposite sides of the periphery of said friction-wheel, said driving-wheels having parallel threaded hubs, and power-applying pulleys engaging said hubs, said pulleys being internally threaded.

9. Power-transmission or driving mechanism comprising, in combination, a driven shaft, a friction-wheel carried thereby, and confronting driving face-wheels or friction-disks at opposite sides of the periphery of said friction-wheel, each face-wheel having a limited movement longitudinally of its axle and having a threaded hub, internally-threaded pulleys engaging said hubs, said pulleys being confined against lateral movement, and the threads of both hubs being substantially parallel or in the same direction.

10. Power-transmission or driving mechanism comprising, in combination, driving and driven shafts, a slidable sleeve or hollow shaft splined on the driven shaft, a friction-wheel carried thereby right-hand and left-hand screws on said driven shaft, a friction-disk or face-wheel driven by the driving-shaft and coactive with said friction-wheel, and automatic means for engaging one screw or the other to shift the friction-wheel toward and from the center of the friction-disk to compensate for variations in rate of speed of the driving-shaft.

11. Power-transmission or driving mechanism comprising, in combination, driving and driven shafts, a slidable sleeve or hollow shaft splined on the driven shaft, a friction-wheel carried thereby right-hand and left-hand screws on said driven shaft, a friction-disk or face-wheel driven by the driving-shaft and coactive with said friction-wheel, idle worm-wheels engaging said screws, and means automatically controlled by the speed of one of said shafts for checking rotation of the worm-wheels to shift said sleeve and thereby adjust the position of said friction-wheel with relation to said friction-disk to compensate for variations in the rate of rotation of the driving-shaft 12. Power-transmission or driving mechanism comprising, in combination, a friction-disk or face-wheel, a slidable shaft having oppositely-threaded screws and having a friction-gear coactive with said friction-disk or face-wheel, and automatic means for engaging the screws to shift said shaft.

13. Power-transmission or driving mechanism comprising, in combination, a friction-disk or face-wheel, a slidable shaft provided with oppositely-threaded screws and a friction-gear carried by said shaft and coactive with said friction-disk or face-wheel, idle worm-wheels in mesh with said screws, and an automatic brake adapted to check rotation of the brake-wheels.

14. Power-transmission or driving mechanism comprising, in combination, a driven shaft, a slidable sleeve or hollow shaft splined thereon having oppositely-threaded screws and a friction-gear also carried by said sleeve, a coactive driving friction-disk or face-wheel, idle worm-wheels in mesh with said screws, brake-bands or friction-rings associated with the hubs or flanges of said worm-wheels, an interposed T-shaped lever having opposite arms connected with said brake-bands, and actuating mechanism connected with the medial arm of said T-shaped lever.

15. Power-transmission or driving mechism comprising, in combination, a driven shaft, a slidable sleeve or hollow shaft splined thereon having a friction-wheel and oppositely-threaded screws, a driving friction-disk or face-wheel coactive with said friction-wheel, automatic screw-engaging devices adapted for shifting the position of the friction-wheel with respect to the driving friction-disk, and automatic screw-releasing devices for preventing shifting of said friction-wheel beyond certain limits.

16. Power-transmission or driving mechanism comprising, in combination, a driven shaft, a slidable sleeve or hollow shaft splined thereon having oppositely-threaded screws and a friction-gear also carried thereby, a driving friction-disk or face-wheel coactive with said friction-gear, idle worm-wheels in mesh with said screws, spring brake-bands surrounding the hubs or flanges of said worm-wheels, each brake-band having a fixed end, brake-trips pivoted to the free ends of said bands and spring-forced apart, an interposed T-shaped lever having opposite arms engaging said trips and adapted thereby to apply one brake or the other, a centrifugal governor on the shaft and operative connections between the same and the medial arm of said T-shaped lever, and trippets carried by said sleeve adapted to engage said brake-trips and thereby disengage them from said T-shaped lever to release the brakes.

17. Power-transmission or driving mechanism comprising, in combination, driving and driven shafts, a slidable sleeve or hollow shaft splined on the driven shaft having a friction-wheel and having right-hand and left-hand screws, a friction-disk or face-wheel driven by the driving-shaft and coactive with said friction-wheel, speed-controlled means for engaging said screws for shifting said sleeve to adjust the position of said friction-wheel with relation to said friction-disk, and means carried by said sleeve for disengaging or releasing said screw-engaging means as the friction-wheel is moved to one or the other of the extreme positions.

In testimony whereof I affix my signature in presence of two witnesses.

JOHN H. THOMPSON.

Witnesses:
 JOHN W. TEWKSBURY,
 T. E. E. BARTLETT.